United States Patent
Toth et al.

(10) Patent No.: US 10,611,198 B2
(45) Date of Patent: Apr. 7, 2020

(54) APPARATUS AND METHOD FOR CONTROLLING A PRESSURE ON AT LEAST ONE TIRE OF A VEHICLE

(71) Applicant: KNORR-BREMSE SYSTEME FUER NUTZFAHRZEUGE GMBH, Munich (DE)

(72) Inventors: Janos Toth, Kecskemet (HU); Marton Gyori, Budapest (HU); Kornel Kantor, Kecskemet (HU); Tamas Toth, Kecskemet (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 79 days.

(21) Appl. No.: 15/757,621

(22) PCT Filed: Sep. 6, 2016

(86) PCT No.: PCT/EP2016/070904
§ 371 (c)(1),
(2) Date: Mar. 5, 2018

(87) PCT Pub. No.: WO2017/045961
PCT Pub. Date: Mar. 23, 2017

(65) Prior Publication Data
US 2019/0023088 A1    Jan. 24, 2019

(30) Foreign Application Priority Data

Sep. 17, 2015 (EP) .................................. 15185605

(51) Int. Cl.
*B60C 23/04* (2006.01)
*B60C 23/00* (2006.01)

(52) U.S. Cl.
CPC ........ *B60C 23/0479* (2013.01); *B60C 23/002* (2013.01); *B60C 23/0408* (2013.01)

(58) Field of Classification Search
CPC ......................... B60C 23/0479; B60C 23/002
See application file for complete search history.

(56) References Cited

U.S. PATENT DOCUMENTS

| 4,583,566 | A | * | 4/1986 | Kalavitz | ............... | B60C 23/001 137/101.19 |
| 5,409,045 | A | * | 4/1995 | Walker | .................. | B60C 23/003 141/38 |

(Continued)

FOREIGN PATENT DOCUMENTS

| CN | 1734246 A | 2/2006 |
| CN | 101184637 A | 5/2008 |

(Continued)

OTHER PUBLICATIONS

International Search Report dated Nov. 8, 2016, of the corresponding International Application PCT/EP2016/070904 filed Sep. 6, 2016.

*Primary Examiner* — Ramsey Refai
(74) *Attorney, Agent, or Firm* — Norton Rose Fulbright US LLP; Gerard Messina

(57) ABSTRACT

An apparatus for controlling a pressure on at least one tire of a vehicle based on a remaining time of travelling to a destination of the vehicle and/or an expected load of the vehicle on a subsequent trip, includes: a data acquisition module to acquire data, the data being indicative of the remaining time of travelling to the destination and/or the expected load of the vehicle on the subsequent trip. The apparatus further includes a data processing module to determine a time of changing the pressure on the at least one (Continued)

tire based on the acquired data and a control module to issue a control signal to initiate the change of the pressure at the determined time.

14 Claims, 6 Drawing Sheets

(56) References Cited

U.S. PATENT DOCUMENTS

| | | | |
|---|---|---|---|
| 6,826,951 B1 * | 12/2004 | Schuessler, Jr. | B60S 5/046 |
| | | | 152/152.1 |
| 7,139,412 B2 | 11/2006 | Kato et al. | |
| 7,512,467 B2 * | 3/2009 | Watabe | B60C 23/007 |
| | | | 307/10.1 |
| 7,729,823 B2 * | 6/2010 | Ruoppolo | B60C 23/0408 |
| | | | 340/505 |
| 8,220,324 B2 * | 7/2012 | Kokubu | B60C 23/0408 |
| | | | 340/442 |
| 8,532,872 B2 * | 9/2013 | Boss | B60C 11/246 |
| | | | 152/415 |
| 8,982,212 B2 | 3/2015 | Mitsuta et al. | |
| 9,434,216 B2 * | 9/2016 | Wilson | B60C 23/003 |
| 9,707,806 B2 * | 7/2017 | Edwards | B60C 23/001 |
| 9,844,983 B2 * | 12/2017 | Chan | B60C 23/003 |
| 10,052,920 B2 * | 8/2018 | Kraayenbrink | B60C 23/002 |
| 10,360,518 B2 * | 7/2019 | Hirose | |
| 10,399,392 B2 * | 9/2019 | King | |
| 2005/0102073 A1 * | 5/2005 | Ingram, II | B60C 23/003 |
| | | | 701/31.4 |
| 2007/0173993 A1 * | 7/2007 | Nielsen | G06Q 10/06 |
| | | | 701/33.4 |
| 2009/0243830 A1 | 10/2009 | Heise et al. | |
| 2011/0285848 A1 | 11/2011 | Han et al. | |
| 2012/0121136 A1 | 5/2012 | Gloger et al. | |
| 2013/0103268 A1 * | 4/2013 | Norton | E01C 19/27 |
| | | | 701/50 |
| 2013/0162830 A1 | 6/2013 | Mitsuta et al. | |
| 2013/0190979 A1 * | 7/2013 | Clayton | B60C 23/002 |
| | | | 701/36 |
| 2013/0282232 A1 * | 10/2013 | Medley | B60C 23/003 |
| | | | 701/34.4 |
| 2015/0202931 A1 * | 7/2015 | Honig | B60C 23/001 |
| | | | 152/416 |

FOREIGN PATENT DOCUMENTS

| | | |
|---|---|---|
| CN | 102145639 A | 8/2011 |
| DE | 102007010782 A1 | 2/2008 |
| EP | 1775952 A2 | 4/2007 |
| JP | 5124672 B2 | 1/2013 |
| WO | 2015/004907 A1 | 1/2015 |

* cited by examiner

APPARATUS AND METHOD FOR CONTROLLING A PRESSURE ON AT LEAST ONE TIRE OF A VEHICLE

FIELD OF THE INVENTION

The present invention relates to an apparatus and a method for controlling a pressure on at least one tire of a vehicle and, in particular, to a tire inflation/deflation initiation method for commercial vehicles.

BACKGROUND INFORMATION

Load dependent tire inflation and tire deflation is not realized on today's standard long-haul commercial vehicles. The tires are typically inflated to a pressure level recommended for carrying the legally allowed load taking into account the vehicle maximum running speed. However, for a considerable part of the work time vehicles run only with partial loading or completely empty. As a result, the tires are often overinflated for the actual load resulting in excessive wear of tire tread (e.g. on a middle "band" portion of the tread). However, unnecessary wear of the tread can be avoided by controlling the tire pressure based on the actual load, i.e. to deflate the tires to a lower pressure level when the load is low and to inflate the tires when the load is higher. An optimal pressure provides the additional benefit of saving fuel.

Furthermore, as their pressures are checked only occasionally and since leakage reduces the pressure between subsequent checks, the tires tend to be underinflated—at least if the pressure was not checked for some time. However, underinflated tires result in an increased rolling resistance of the tires, which results in more fuel consumption and causes damages of the tire case more often. This is in particular critical, because damages of the tire case can result in an explosion of the tire and thus impairs safety.

Systems for maintaining a tire pressure at a maximum pressure level, independently of the load, are common and are known as automatic tire inflation systems (ATIS).

Moreover, central tire inflation systems (CTIS) are available for off-road and agricultural vehicles to improve off-road or field moving capabilities or to save fuel under off-road conditions. Manual tire pressure selections are likewise known.

For example, US 2007/0068238 A1 discusses a tire inflation system for use with an agricultural implement linked to a work vehicle for movement in a field. The tire inflation system includes a database of soil conditions corresponding to a location, an implement load sensor, a location determiner, a processor and a tire inflation controller so that the processor can determine the proper inflation of the implement tires based on the corresponding factors. US 2012/0221196 A1 discusses another active tire controller device that operates a vehicle either in a city operating condition or in a highway operating condition. Once a highway operating condition is established, an on-board tire pressure controller may be commanded to set a relatively high tire inflation pressure optimizing the tires to minimize rolling resistance and thereby enhancing fuel economy. In a city operating condition, the tire inflation pressure may be returned to normal values optimizing inflation pressure for vehicle dynamic capabilities for manoeuvring, braking or traction.

These systems require a considerable amount of air (e.g. up to 7000 Nltr; normal liter or liter at atmospheric pressure) on a long-haul commercial vehicle combination. However, compressor capacities are limited by confined engine space and costs. As a result, a user has often to wait a long time (e.g. 5 to 30 minutes) before the tire pressure has reached the level needed for the vehicle to safely start its route. Such required time period for inflating the tire(s) is often not acceptable for the user. Furthermore, it is not feasible that a vehicle with low-pressure tire goes into the dock and that a fully laden vehicle with insufficient tire pressure would start the next journey. Tires typically do not tolerate an excessive load when they are on low pressure, nor could the vehicle safely move on. Tire damages would be very likely.

Therefore, there is a demand for an improved way of controlling the pressure of the tire(s) of a vehicle without imposing additional requirements on the air supply system of the vehicle.

SUMMARY OF THE INVENTION

The present invention solves the aforementioned problems by an apparatus according to the descriptions herein, a vehicle according to the descriptions herein, a server according to the descriptions herein, and a method according to the descriptions herein. The further descriptions herein refer to specifically advantageous realizations of the subject matter of the main descriptions herein.

The present invention relates to an apparatus for controlling a pressure on at least one tire of a vehicle based on a remaining time of travelling to a destination (expected duration to reach a destination) of the vehicle and/or an expected load of the vehicle on a subsequent trip. According to the present invention, the apparatus comprises a data acquisition module, a data processing module, and a control module. The data acquisition module is configured to acquire data being indicative of the remaining time of travelling to the destination and/or the expected load of the vehicle on the subsequent trip. The data processing module is configured to determine a time of changing the pressure on the at least one tire based on the acquired data. The control module is configured to issue a control signal to initiate the change of the pressure at the determined time. The destination is, for example, a planned end position of the vehicle, but may also be any intermediate stop, where the load of the vehicle is changed and the vehicle continues with the subsequent trip after the intermediate stop.

Such apparatus may be part of an electronic control unit configured to provide the defined functions, i.e. the modules may be implemented by installed software to control the hardware of the control unit accordingly.

The increased load can be associated with an increased pressure and if the data indicate an increased load on the subsequent trip, the control module may, according to further embodiments, be configured to control the pressure of the tire(s) such that the pressure increases monotonically up to an increased pressure.

The data processing module may further have access to vehicle-specific information, as for example, a time needed to adjust the tire pressure from one level to another level (e.g. a pumping rate of a respective pump to increase the tire pressure) or what kind of tires are installed on the vehicle and what is their optimal inflation pressure. The correspondence of a specific load to a desired pressure on the tire(s) may be provided by any kind of lookup table, which assigns each load (or range of load) a respective optimal tire pressure so that the associated increased pressure can be obtained from such a lookup table. However, the increased pressure may also be slightly higher than the desired pressure in order to avoid any further increase of the pressure after the vehicle has been fully loaded, because decreasing the pressure is always easier and faster than increasing the pressure. For example, if the control module sets a pressure above the desired value, the control module may cause a reduction of pressure to the optimal value after the vehicle has departed from the destination, i.e. during the subsequent trip. However, this procedure is not mandatory and in further embodiments the desired tire pressure will be set from a slightly lower value to a higher value representing the desired value, thereby avoiding any over-pressurizing of the tire(s).

According to yet another embodiment, the data processing module is configured to determine the time of changing the pressure on the tire(s) dependent on an expected stay at the destination. This may, in particular, be of advantage if during a stay the engine can still be running so that a tire pressure adjustment can also be performed during the stay at the destination. However, if during the expected stay at the destination the engine may not be running, the tire inflation process should be performed by or before arriving at the destination. In any case, it is of advantage, if the increased level of the tire pressure is reached before departing for the subsequent trip from the destination and the time of travelling with an over-pressurized tire should be minimized.

Further, if the data indicate a decreased load on the subsequent trip, the control module may, according to further embodiments, be configured to keep the pressure on the tire(s) until arriving at the destination and to initiate a decrease in the pressure on the tire(s) upon departing for the subsequent trip to a desired pressure for the load on the subsequent trip of the vehicle. Optionally, if an expected travel time on the subsequent trip is below a predetermined limit (e.g. below 20, 30, 60 or 100 minutes), the control module may keep the pressure on the at least one tire also after departing from the destination.

The increase or decrease in the pressure may be performed by a tire inflation device of the vehicle, which is controlled by the control signal issued from the control module.

According to yet another embodiment, a remote server can take over control on various functions by transmitting respective control signals and/or data to the vehicle. In particular, the data acquisition module may in further embodiments acquire the data from the remote server. Furthermore, the vehicle may submit periodically actual positions of the vehicle to the remote server and the remote server may determine an estimated time of arrival at the destination and/or a remaining time of travelling to the destination based on these data. In addition, according to further embodiments, the data acquisition module may acquire from the remote server the determined remaining time of travelling to the destination and/or the estimated time of arrival.

The remote server may be a fleet management center at a remote location, which keeps contact with the vehicle over a wireless connection (e.g. GSM, CDMA, EDGE, UMTS, LTE, etc). Therefore, according to further embodiments, the apparatus comprises a wireless module to communicate with a remote server, and the data acquisition module may be configured to acquire the data by using the wireless module from the remote server.

The vehicle may also comprise a position determination module being configured to determine one or more of the following: an actual position of the vehicle, a distance between the actual position and the destination, the remaining driving time to the destination. According to yet another embodiment, the data acquisition module may acquire as data the distance between the actual position and the destination from the position determination module. The data processing module may further be configured to determine the remaining time of travelling based on the distance between the actual position and the destination and/or the expected driving speed on the remaining part of the trip. Hence, the data indicating the remaining time of travelling to the destination may include an actual position of the vehicle and the estimated time of arrival at the destination.

The position determination module may be a navigational system, which is installed on board of the vehicle. Alternatively, the navigational system or at least a global positioning module may be part of the apparatus and may acquire periodically positional data and provide these data the processing module or store the data in a data storage. Therefore, according to further embodiments, the data may be acquired from a data storage installed on the vehicle.

According to further embodiments, the apparatus includes the position determination module (e.g. a global positioning system, GPS). Furthermore, the data processing module may use the vehicle speed and/or the traffic situation to determine a driving time between the actual position and the destination. This information may be provided by a navigational system or by the remote server. The speed may be obtained from other sensors (e.g. a speedometer or any kind of rotation sensor) of the vehicle or may be determined from periodically determined actual positions (with a known period).

The present invention relates also to a vehicle, especially to a commercial vehicle, which comprises one of the above-described apparatus. The commercial vehicle may further comprise a wireless communication device and/or a navigational system configured to determine an actual position of the vehicle.

The present invention relates also to a method for controlling a pressure on at least one tire of a vehicle based on a remaining time of travelling to a destination of the vehicle and/or an expected load of the vehicle on a subsequent trip. The method comprises the following steps: acquiring data, the data being indicative of the remaining time of travelling to the destination and/or being indicative of the expected load of the vehicle on the subsequent trip; determining a time of changing the pressure on the at least one tire based on the acquired data; and issuing a control signal to initiate the change of the pressure at the determined time.

This method may also be implemented in software or as a computer program product. Thus, the present invention relates also to a computer program product having a program code stored thereon for performing the above-mentioned method, when the computer program is executed on a computer or processor. The method may be performed by the apparatus as defined above and all functions described previously can be realized as further method steps and be implemented in hardware or software modules.

Various embodiments of the present invention will be described in the following by way of examples only, and with respect to the accompanying drawings.

DETAILED DESCRIPTION

Figure 1:
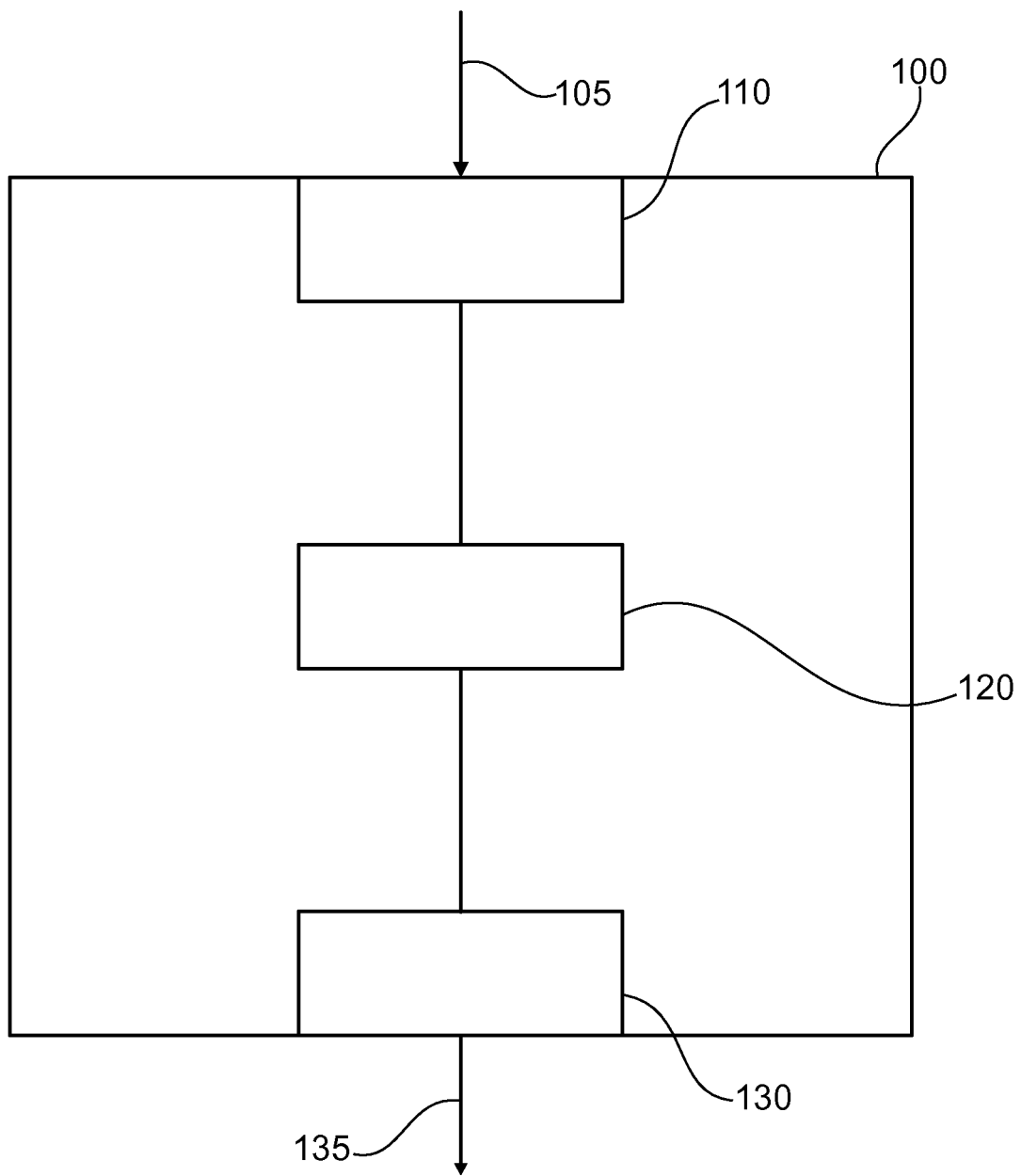
FIG. 1 depicts an apparatus for controlling a pressure on tire(s) of a vehicle according to an embodiment of the present invention.

FIG. 1 depicts an apparatus 100 for controlling a pressure on tire(s) of a vehicle based on a remaining time of travelling to a destination of the vehicle and/or an expected load of the vehicle on a subsequent trip. The apparatus 100 comprises a data acquisition module 110, a data processing module 120, and a control module 130. The acquisition module 110 is configured to acquire data 105, wherein the data 105 are indicative of the remaining time of travelling to the destination and/or of the expected load of the vehicle on the subsequent trip. The data processing module 120 is configured to determine a time of changing the pressure on the tire(s) based on the acquired data. The control module 130 is configured to issue a control signal 135 to initiate the change of pressure at the determined time.

The tire inflation adjustment may be performed by a tire pressure inflation device. This device may need a particular time to increase the pressure from a first level to a second level (depending on the expected load). If 10 minutes, for example, are needed to reach the second level, and if the data processing module 120 acquires the information that the expected duration until arrival at the destination is, for example, 20 minutes, the control module 130 may be configured to wait 10 minutes until the tire pressure starts to increase. It is also possible that the data processing module 120 or the controlling module 130 compare periodically the remaining time of travelling with the time needed to adjust the tire pressure and if both time periods coincide, the control module 130 may issue the control signal 135.

Therefore, the present invention solves the above-mentioned technical problem by providing an apparatus to inflate tires in advance, typically at the end of a lower load trip while the vehicle is still in motion. Before starting the inflation process the apparatus 100 acquires or determines in advance the planned time period between the current position and the end position of the trip and, in addition, the expected load on the next trip. Based on these information and pneumatic characteristics of the air supply and the tire inflation system, the system can calculate when the inflation process needs to be started before arriving at the end position. Hence, the system is compatible with any installed hardware. Even for systems with restricted capabilities, the invention can be implemented without losing time before starting the next trip, because the information about the capabilities will be taken into account when determining the time when the inflation process shall start. On the other hand, a deflation can either be carried out at the end of the actual trip or at the beginning of the next trip, thereby avoiding traveling with insufficiently pressurized tires.

Figure 2:
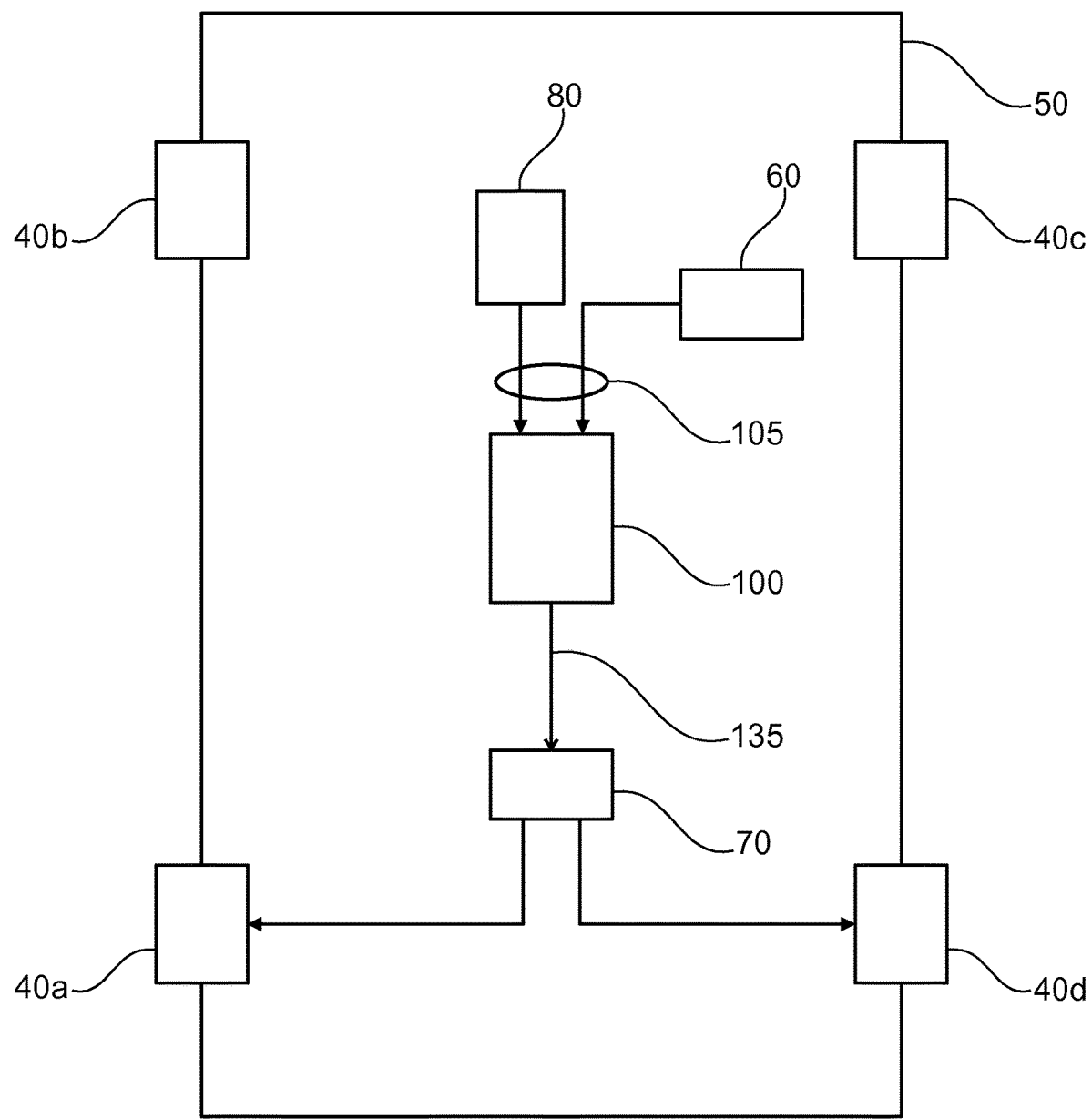
FIG. 2 depicts a schematic overview of the vehicle with the apparatus coupled to further components of the vehicle.

FIG. 2 depicts a schematic overview of the vehicle 50 with four wheels with respective tires 40a, 40b, 40c, and 40d. The vehicle 50 includes the apparatus 100, an optional position determination module 80, an optional data storage 60, and the tire inflation device 70.

The position determination module 80 is configured to determine a position of the vehicle and/or the remaining time of travelling to the destination. The respective data 105 are provided to the apparatus 100. The position determination module 80 may also determine periodically the position of the vehicle 50 with predetermined period(s) so that based on the time periods the position determination module 80 may determine the current speed of the vehicle 50. The position determination module 80 may, for example, be a navigational system installed on the vehicle and being able to output the respective data 105 for the apparatus 100.

The data storage 60 may store data related, for example, to the load of the subsequent trip(s) and all kind of other data as, for example, characteristics of the tires 40, their optimal tire pressure associated with a given load and/or speed, and characteristics of the installed tire inflation device 70. These data 105 are likewise provided for the apparatus 100.

The tire inflation device 70 is configured to control the inflation pressure on the tire(s) 40 and is controlled by the control signal 135 received from the apparatus 100 to modify the inflation pressure on the tire(s) 40 at a particular time, which is determined by the apparatus 100.

With such systems, the following operation mode can be realized. The apparatus 100 may receive the data 105 being indicative of the remaining time of travelling to the destination from the position determination module 80 and/or the load of the vehicle on the subsequent trip from the data storage 60. The apparatus 100 issues the control signal 135 to the tire inflation device 70. Upon receiving the control signal 135, the tire inflation device 70 may control in due course the inflation pressure on the tire(s) 40.

The control signal 135 may control one or more of the tires 40. For example, the pressure on the front tires may not need to be adjusted, because the load on these tires may not change during subsequent trips. Therefore, the control signal 135 may be indicative to adjust the inflation pressure only on one or more of the rear tires 40a, 40b (or tires of a trailer). Furthermore, there may be one or more tire inflation devices 70 installed on the vehicle 50 (for example for each tire one device), in which case the control module 130 may be configured to transmit separate control signals 135 to the separate tire inflation devices 70, e.g. via a data bus installed on the vehicle 50.

Figure 3:
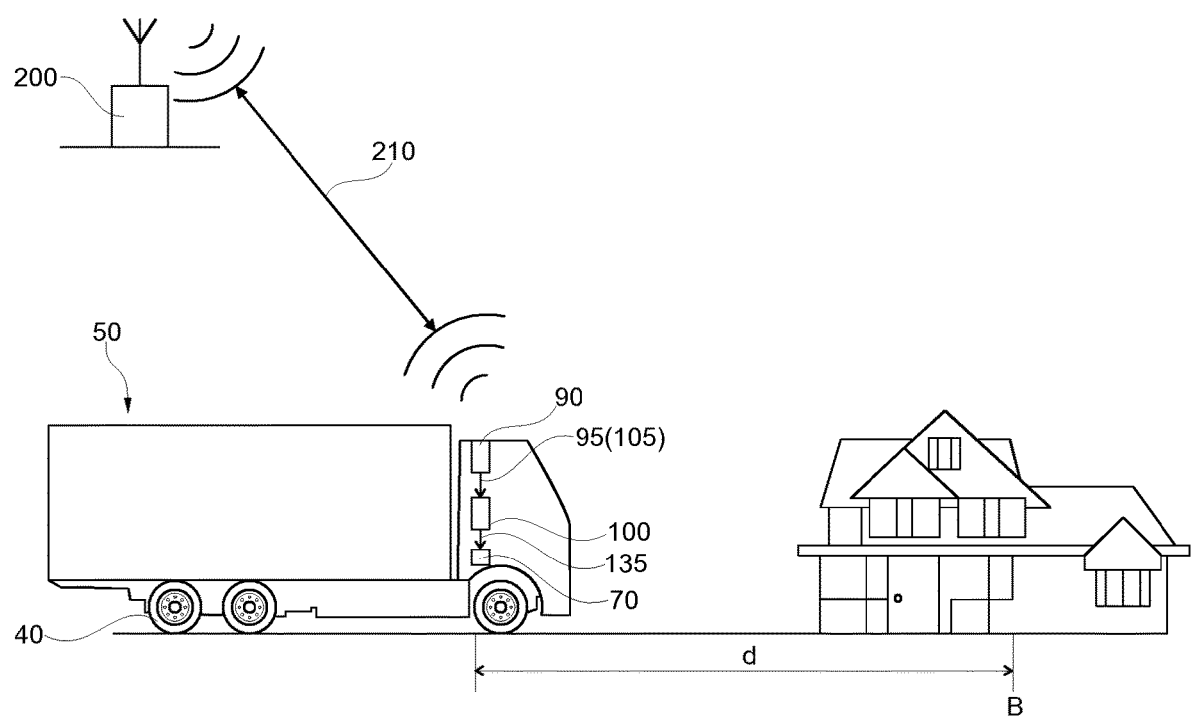
FIG. 3 depicts the vehicle while traveling to a destination and coupling to a remote server according to further embodiments.

FIG. 3 depicts the vehicle 50 with the apparatus 100 on a trip to the destination B. In this embodiment the apparatus 100 couples to a wireless communication device 90 installed on the vehicle 50. The wireless communication device 90 may be part of a fleet management device that is installed on the vehicle 50 and keeps (permanently or temporarily) a wireless communication link 210 (for example a GSM connection) to a fleet management server 200. The fleet management server 200 is a remote server being configured to provide one or more vehicles with respective information about trips and/or loads or other information to optimize the transportation capabilities of the fleet of vehicles. The fleet management server 200 may be installed at a remote, non-mobile location.

In this embodiment, the apparatus 100 may receive via the wireless communication device 90 information from the remote server 200. The received information may supplement or replace the information received from the optional position determination module 80 and/or the optional data storage 60 as shown in FIG. 2. The information received from the remote server 200 may include one or more of the following: the distance "d" between the vehicle 50 and the destination B, the estimated time of arrival at the destination B, the remaining driving time to the destination B, the expected load on the subsequent trip, characteristics of the tires 40, their optimal tire pressure associated with a given load and/or speed, characteristics of the installed tire inflation device 70, other information needed to optimize the operation of the vehicle 50.

For example, the vehicle 50 may be configured to transmit periodically the position of the vehicle 50 to the remote server 200 via the wireless communication link 210. Based thereon, the remote server 200 may determine a remaining time of travelling to the destination B, for example, by taking into account the traffic situation between the current position of the vehicle 50 and the destination B. The resulting information (data 105) is again transmitted to the wireless communication device 90 on the vehicle 50 using the wireless communication link 210. The wireless communication device 90 forwards this information or the corresponding data 105 to the apparatus 100. Optionally, this data 105 may be stored in the data storage 60 on the vehicle 50 (not shown in FIG. 3), from where the apparatus 100 may retrieve the data 105, when needed.

A serial communication link 95 (for example RS232/USB) may be set up for the communication between the wireless communication device 90 and the apparatus 100. Based on the data 105 received from the remote server 200, the apparatus 100 again issues the control signal 135 to the tire inflation device 70 which controls, based thereon, the inflation pressure on the tire(s) 40.

In further embodiments, the apparatus 100 may likewise be installed at a remote location (e.g. being part of a server such as the remote server 200), in which case the control signal 135 issued by the control module 130 will be transmitted to the vehicle 50, e.g., using a wireless communication unit installed on the server 200 and the wireless communication link 120. After receiving this control signal 135, the wireless communication device 90 may directly forward this signal 135 to the tire inflation device 70 to control immediately the tire pressure.

Figure 4:
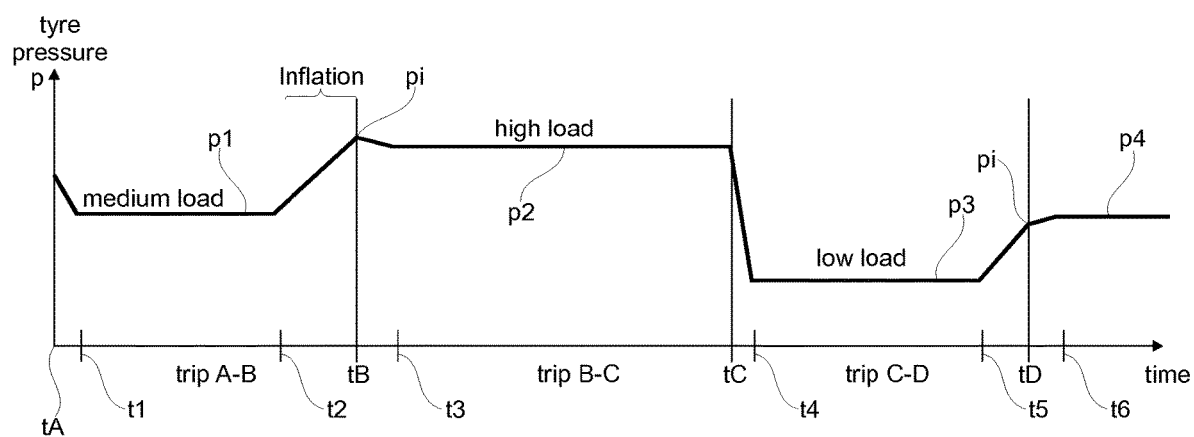
FIG. 4. depicts a timeline showing variations of the tire pressure along a route from a starting position via various destinations.

FIG. 4 depicts a timeline showing the variations of the tire pressure p along a route of the vehicle 50 from a starting point A to a first destination B, and further to a third destination C, and to a fourth destination D.

At time to the vehicle 50 starts the first trip A-B at the starting position A and reaches the first destination B at the arrival time tB. During this trip A-B the vehicle 50 carries a medium load being, for example, lower than on a previous trip. Hence, the tire pressure p is decreased upon departing from the position A to a desired (or optimal) tire pressure p1 for the medium load achieved at a first time t1>tA. This desired tire pressure p1 is maintained up to a second time t2, where the tire pressure p is increased monotonically to an increased level pi reached at the arrival time tB. The second time t2 is determined by the apparatus 100 based on the expected remaining time of travelling to the first destination B and the expected load on the subsequent trip B-C. The second time t2 further depends on the time needed to increase the pressure p up to the increased level pi and depends thus on the load differences (or the corresponding pressure differences) and the ability of the tire inflation device 70 to change the inflation pressure p (e.g. a pumping rate of an installed compressor).

After being loaded at the first destination B, the vehicle 50 continues with the second trip B-C with a high load (higher than the medium load) to the second destination C. Therefore, when compared to the first tire pressure p1 associated to the medium load on the first trip A-B, the tire pressure p on the second trip B-C shall have a second value p2>p1. According to the present invention, the tire pressure p will be increased during (or at the end of) the first trip A-B up to an increased pressure level pi, which may exceed the accurate or desired second tire pressure p2 for the high load on the second trip B-C. Therefore, when departing from the first destination B, the tire pressure p will be reduced to the desired second pressure level p2, which is achieved at a third time t3>tB.

On the third trip C-D from the second destination C to the third destination D, the vehicle 50 is expected to have a low load (lower than the high load and lower than the medium load). In such situations, the apparatus 100 may keep the second pressure level p2 up to the arrival time tC at the second destination C. Upon departing from the second destination C at the time tC the deflation may start and ends on a fourth time t4>tC, where the desired third pressure level p3, associated with the low load on the third trip C-D, is obtained. After this third trip, the expected load for the vehicle 50 increases again. Therefore, according to the present invention, before arriving at the third destination D at time of arrival tD, the apparatus 100 controls the tire inflation device 70 to increase again the tire pressure p up to an increased level pi at a fifth time t5<tD. However, in contrast to the embodiment implemented on the first trip A-B, the increased level pi (reached at the time of arrival tD at the third destination) is now lower than a desired pressure level p4 on the fourth trip departing from the third destination D. Hence, upon departing from the third destination D, the tire(s) have to be inflated further to reach the desired pressure level. This may be needed, for example, in cases if the actual load is not exactly known in advance and thus it may become necessary to correct the pressure p when the loads of the axles are properly measured at the beginning of the next trip.

The effort of making the pressure adjustment may not always be justified. For example, if the trip is only very short, i.e. less than a predetermined time period (e.g. less than 30, 60, 100 or 200 minutes), the pressure p may not be modified and instead be kept at the corresponding level. Therefore, in yet another embodiment, if information about the distance of the next trip and/or its expected duration is known, the system (e.g. the apparatus 100 or the remote server 200) may judge whether or not the inflation of the tires shall be performed (i.e. whether it is reasonable). In this judgement the system may take into consideration whether fuel and tire tread can be saved, compared to the energy needed to inflate the tires to a high pressure level. For example, if the third trip C-D is only very short (e.g. less than twice the time needed to inflate the tire(s)), the second pressure p2 may be kept until arriving at the third destination D at the time tD without any actuation of the tire inflation device 70.

For simplicity, in FIG. 4 the arrival time and departure time are set equal, which in real situations will not occur. The time of staying at the destinations (e.g. to load the vehicle) was cut out from FIG. 4, because during this time typically no pressure adjustments are carried out.

However, according to further embodiments, the starting point, where the tire inflation pressure starts to increase, may also be set based on an expected stay at the destination. This may, for example, be of advantage if during the stay at the destination, the engine of the vehicle 50 can still run so that an adjustment of the tire pressure level can also be performed during the stay at that destination. However, if the engine has to be turned off, the apparatus 100 should be configured to reach the increased tire pressure level before or at the moment of arrival at the respective destination (with a possible margin of +/−5% or +/−20%).

Figure 5:
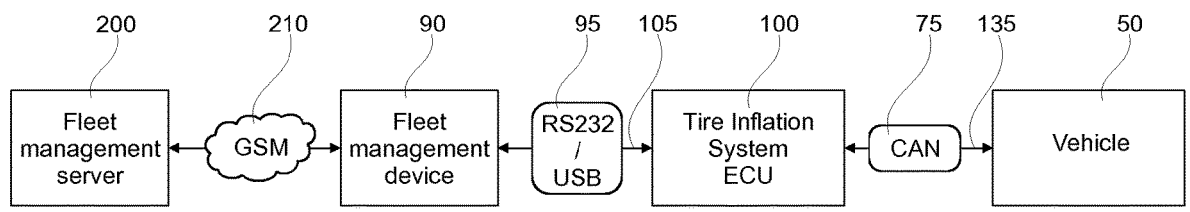
FIG. 5. illustrates a possible system architecture.

FIG. 5 depicts a possible architecture for a respective product. For example, a fleet management server 200 acts as a remote server to manage the fleet of various vehicles including the vehicle 50. The remote server 200 is connected to a fleet management device 90 on the vehicle 50, for example, via a GSM wireless connection 210 (or any other mobile communication standard, e.g. UMTS, LTE, EDGE, etc). The fleet management device 90 may be connected to the apparatus 100 via an internal bus such as an RS232/USB connection. The apparatus 100 may be part of a tire inflation system ECU (electronic control unit=ECU). The tire inflation system 100 may then be connected to the CAN bus 75 (controller area network=CAN) to transmit the control signal 135 to the respective components of the vehicle 50 to control finally the inflation pressure of the tire(s) 40.

Figure 6:
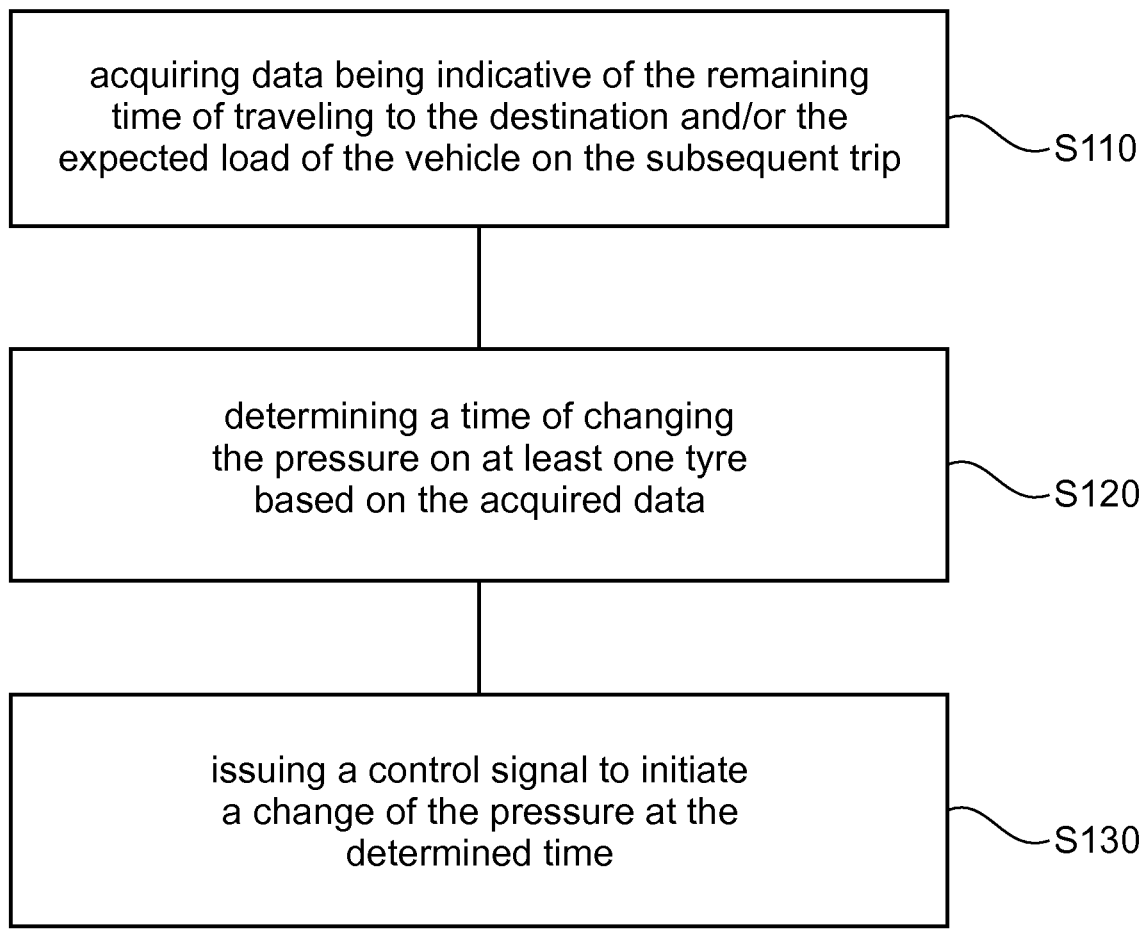
FIG. 6 depicts a flow chart of an exemplary method according to the present invention.

FIG. 6 depicts an embodiment for a method for controlling a pressure p on the tire(s) 40 of the vehicle 50 based on a remaining time of travelling to a destination B of the vehicle 50 and/or an expected load of the vehicle 50 on a subsequent trip B-C, C-D. The method comprises the steps of acquiring S110 data 105, wherein the data 105 are indicative of the remaining time of travelling to the destination B; C and/or the expected load of the vehicle 50 on the subsequent trip B-C, C-D. The method comprises further the step of determining S120 a time t2, tC of changing the pressure p on the tire(s) 40 based on the acquired data 105; and the step of issuing S130 a control signal 135 to initiate the change of the pressure p at the determined time t2, tC.

This method may also be performed by the apparatus 100 or be implemented as software running on a computing hardware such as an electronic control unit (ECU) of a vehicle. The computer may be any processing unit comprising, for example, a processor, a non-volatile memory for storing the computer program, a data bus for transferring data between the non-volatile memory and the processor and, in addition, input/output interfaces for inputting and outputting data from the computer.

Embodiments of the present invention provide the following advantages: The inflation may be realized when the vehicle effectively works so that no unpaid downtime is used for tire inflation. In addition, unwanted noise is omitted at the dock in a logistic site (i.e. the destination). The system works moreover automatically without driver assistance and influence.

Embodiments can easily be implemented on existing systems or a whole fleet of vehicles, because the information about the loads on the various trips, the details about the desired pressures and other relevant data (e.g. the expected time of traveling between the destinations) may exist at logistic companies' fleet management systems 200. Such systems include a logistic management part 200, which for the fleet plans and logs the trips, the vehicles carriage, the load, etc. The needed data can be sent to the selected vehicles 50, so that at the vehicles 50 no or only little calculation or optimization has to be done. For this, a wireless data transmission 210 (e.g. GSM) may be used and the driver can be informed on an appropriate display. When such a system provides the above-mentioned inputs to the tire inflation system, it is able to make the inflation and/or deflation demands.

With the suggested solution the potential of a tire inflation system can be fully utilized in an automatic way. Most fleets already have such a fleet management system infrastructure in use, which can provide all needed input.

Major aspects of the present invention can be summarized as follows. Tires of a commercial vehicle start to be inflated to higher pressure based on the information about a calculated time (based on distance between the actual position and a planned end position) and the expected load for the following trip. The inflation starting point in time is automatically calculated and the inflation is automatically executed using input, which comes from a fleet management system or from a cloud. Furthermore, the tires of the commercial vehicles may start to be inflated to higher pressure values based on information about a calculated inflation starting point and a calculated remaining part of the actual trip, for example by GPS, wherein the inflation starting point in time or the GPS coordinate or distance is automatically calculated and the inflation is automatically executed based on the planned end position and the actual trip and the expected load on the following trip. These inputs again come from the fleet management system or from the exemplary cloud.

Furthermore, while each embodiment may stand on its own as a separate example, it is to be noted that in other embodiments the defined features can be combined differently, i.e. a particular feature descripted in one embodiment may also be realized in other embodiments. Such combinations are covered by the disclosure herein unless it is stated that a specific combination is not intended.

The reference signs are as follows:
40 tire(s)
50 vehicle
60 data storage
70 tire inflation device
80 position determination module
90 wireless communication device
100 apparatus
105 acquired data
110 data acquisition module
120 data processing module
130 control module
135 control signal
200 remote server
210 wireless communication link
A, B, C destinations
p, p1, p2 . . . tire inflation pressure

The invention claimed is:

1. An apparatus for controlling a pressure on at least one tire of a vehicle based on a remaining time of travelling to a destination of the vehicle and/or an expected load of the vehicle on a subsequent trip, comprising:
   a data acquisition module to acquire data, the data being indicative of the remaining time of travelling to the destination and/or the expected load of the vehicle on the subsequent trip;
   a data processing module to determine a time of changing the pressure on the at least one tire based on the acquired data; and
   a control module to issue a control signal to initiate the change of the pressure at the determined time;
   wherein the vehicle includes a position determination module configured to determine an actual position of the vehicle and a distance between the actual position and the destination, wherein the data acquisition module is configured to acquire as data the distance between the actual position and the destination from the position determination module, and wherein the data processing module is further configured to determine the remaining time of travelling based on the distance between the actual position and the destination.

2. The apparatus of claim 1, wherein, if the data indicate an increased load on the subsequent trip, the increased load is associated with an increased pressure, and wherein the control module is configured to control the pressure of the at least one tire such that the pressure increases monotonically up to the increased pressure by an expected departure time for the subsequent trip.

3. The apparatus of claim 2, wherein the increased pressure exceeds a pressure desired for the increased load on the subsequent trip.

4. The apparatus of claim 1, wherein the data processing module is configured to determine the time of changing the pressure on the at least one tire dependent on an expected stay at the destination.

5. The apparatus of claim 1, wherein, if the data indicate a decreased load on the subsequent trip, and wherein the control module is configured to keep the pressure on the at least one tire until arriving at the destination and, if an expected travel time on the subsequent trip is below a predetermined limit, the control module is configured to keep the pressure on the at least one tire after departing from the destination.

6. The apparatus of claim 2, wherein the control module is configured to initiate a pressure reduction on the at least one tire upon departing for the subsequent trip from the destination to a desired pressure for the load on the subsequent trip of the vehicle.

7. The apparatus of claim 1, wherein the data acquisition module is configured to acquire the data from a remote server or from a data storage on the vehicle, and wherein the acquisition from the remote server includes using a wireless communication link of the vehicle to the remote server.

8. The apparatus of claim 1,
wherein the data processing module is configured to determine a driving time between the actual position and the destination based on a speed of the vehicle.

9. The apparatus of claim 7, wherein the vehicle is configured to submit periodically actual positions of the vehicle to the remote server and the remote server is configured to determine an estimated time of arrival at the destination and/or a remaining time of travelling to the destination of the vehicle, and wherein the data acquisition module is configured to acquire from the remote server the determined remaining time of travelling to the destination and/or the estimated time of arrival.

10. The apparatus of claim 1, further comprising:
a wireless module to communicate with a remote server;
wherein the data acquisition module is configured to acquire the data by using the wireless module from the remote server.

11. A commercial vehicle, comprising:
an apparatus for controlling a pressure on at least one tire of a vehicle based on a remaining time of travelling to a destination of the vehicle and/or an expected load of the vehicle on a subsequent trip, including:
a data acquisition module to acquire data, the data being indicative of the remaining time of travelling to the destination and/or the expected load of the vehicle on the subsequent trip;
a data processing module to determine a time of changing the pressure on the at least one tire based on the acquired data; and
a control module to issue a control signal to initiate the change of the pressure at the determined time;
wherein the vehicle includes a position determination module configured to determine an actual position of the vehicle and a distance between the actual position and the destination, wherein the data acquisition module is configured to acquire as data the distance between the actual position and the destination from the position determination module, and wherein the data processing module is further configured to determine the remaining time of travelling based on the distance between the actual position and the destination.

12. A server, comprising:
an apparatus for controlling a pressure on at least one tire of a vehicle based on a remaining time of travelling to a destination of the vehicle and/or an expected load of the vehicle on a subsequent trip, including:
a data acquisition module to acquire data, the data being indicative of the remaining time of travelling to the destination and/or the expected load of the vehicle on the subsequent trip;
a data processing module to determine a time of changing the pressure on the at least one tire based on the acquired data; and
a control module to issue a control signal to initiate the change of the pressure at the determined time; and
a wireless communication unit to transmit the control signal to the vehicle to control a pressure on the at least one tire to the vehicle;
wherein the vehicle includes a position determination module configured to determine an actual position of the vehicle and a distance between the actual position and the destination, wherein the data acquisition module is configured to acquire as data the distance between the actual position and the destination from the position determination module, and wherein the data processing module is further configured to determine the remaining time of travelling based on the distance between the actual position and the destination.

13. A method for controlling a pressure on at least one tire of a vehicle based on a remaining time of travelling to a destination of the vehicle and/or an expected load of the vehicle on a subsequent trip, the method comprising:
acquiring data, via a data acquisition module, the data being indicative of the remaining time of travelling to the destination and/or the expected load of the vehicle on the subsequent trip;
determining, via a data processing module, a time of changing the pressure on the at least one tire based on the acquired data; and
issuing, via a control module, a control signal to initiate the change of the pressure at the determined time;
wherein the vehicle includes a position determination module configured to determine an actual position of the vehicle and a distance between the actual position and the destination, wherein the data acquisition module is configured to acquire as data the distance between the actual position and the destination from the position determination module, and wherein the data processing module is further configured to determine the remaining time of travelling based on the distance between the actual position and the destination.

14. A non-transitory computer readable medium having a computer program, which is executable by a processor, comprising:
a program code arrangement having program code for controlling a pressure on at least one tire of a vehicle based on a remaining time of travelling to a destination of the vehicle and/or an expected load of the vehicle on a subsequent trip, by performing the following:
acquiring data, via a data acquisition module, the data being indicative of the remaining time of travelling to the destination and/or the expected load of the vehicle on the subsequent trip;
determining, via a data processing module, a time of changing the pressure on the at least one tire based on the acquired data; and
issuing, via a control module, a control signal to initiate the change of the pressure at the determined time;

wherein the vehicle includes a position determination module configured to determine an actual position of the vehicle and a distance between the actual position and the destination, wherein the data acquisition module is configured to acquire as data the distance between the actual position and the destination from the position determination module, and wherein the data processing module is further configured to determine the remaining time of travelling based on the distance between the actual position and the destination.

* * * * *